United States Patent
Wu

(10) Patent No.: US 9,619,119 B2
(45) Date of Patent: Apr. 11, 2017

(54) INFORMATION PROMPT METHOD, APPARATUS AND TERMINAL DEVICE

(71) Applicant: Huawei Device Co., Ltd., Shenzhen (CN)

(72) Inventor: Huangwei Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 113 days.

(21) Appl. No.: 14/310,991

(22) Filed: Jun. 20, 2014

(65) Prior Publication Data

US 2014/0304617 A1    Oct. 9, 2014

Related U.S. Application Data

(63) Continuation of application No. PCT/CN2012/081567, filed on Sep. 19, 2012.

(30) Foreign Application Priority Data

Dec. 21, 2011    (CN) .......................... 2011 1 0432256

(51) Int. Cl.
*G06F 3/048*    (2013.01)
*G06F 3/0484*    (2013.01)
(Continued)

(52) U.S. Cl.
CPC ........... *G06F 3/0484* (2013.01); *G06Q 10/10* (2013.01); *H04M 1/274533* (2013.01); *H04M 1/72552* (2013.01); *H04L 61/1594* (2013.01)

(58) Field of Classification Search
CPC ... G06F 3/484; G06F 3/0484; H04M 1/72552
(Continued)

(56) References Cited

U.S. PATENT DOCUMENTS 7,475,344 B1 *    1/2009    Patil ...................... G06F 3/0237
                                                    704/246
2004/0153963 A1 *    8/2004    Simpson ............... G06F 3/0237
                                                    715/202
(Continued)

FOREIGN PATENT DOCUMENTS

CN            10103115 A      9/2007
CN            101031099 A     9/2007
(Continued)

OTHER PUBLICATIONS

"vCard", taken from https://en.wikipedia.org/wiki/VCard, published Feb. 20, 2009, pp. 1-4.*
(Continued)

*Primary Examiner* — William Bashore
*Assistant Examiner* — Gregory A Distefano
(74) *Attorney, Agent, or Firm* — Slater Matsil, LLP

(57) ABSTRACT

Embodiments of the present invention provide an information prompt processing method, apparatus, and terminal device. The information prompt processing method includes: identifying a contact keyword contained in body content edited in an editing interface; extracting from a contact database at least one piece of contact information corresponding to the contact keyword, generating at least one editing operation according to the contact information and an operation command for the contact information, and displaying the at least one editing operation in the editing interface for a user to select; and executing the operation command for the contact information corresponding to the editing operation according to the selection of the user. The operation process in the embodiments of the present invention is simple, and the operation efficiency when the user adds contact information is improved.

12 Claims, 6 Drawing Sheets

(51) Int. Cl.
*G06Q 10/10* (2012.01)
*H04M 1/2745* (2006.01)
*H04M 1/725* (2006.01)
*H04L 29/12* (2006.01)

(58) Field of Classification Search
USPC .......................................................... 715/752
See application file for complete search history.

(56) References Cited

U.S. PATENT DOCUMENTS

| | | | |
|---|---|---|---|
| 2004/0221242 A1* | 11/2004 | Chen | G06F 17/243 |
| | | | 715/810 |
| 2006/0035632 A1 | 2/2006 | Sorvari et al. | |
| 2006/0155785 A1* | 7/2006 | Berry | G06Q 10/10 |
| 2006/0179114 A1* | 8/2006 | Deeds | G06Q 10/107 |
| | | | 709/206 |
| 2008/0178076 A1* | 7/2008 | Kritt | G06F 17/273 |
| | | | 715/257 |
| 2009/0158167 A1* | 6/2009 | Wang | G06F 3/0482 |
| | | | 715/745 |
| 2011/0119593 A1* | 5/2011 | Jacobson | G06Q 30/02 |
| | | | 715/736 |
| 2012/0011426 A1* | 1/2012 | Yach | G06F 17/2705 |
| | | | 715/208 |
| 2013/0054579 A1* | 2/2013 | Kennedy | G06F 17/30994 |
| | | | 707/723 |

FOREIGN PATENT DOCUMENTS

| | | |
|---|---|---|
| CN | 101031115 A | 9/2007 |
| CN | 101651744 A | 2/2010 |
| CN | 101741948 A | 6/2010 |
| CN | 101945343 A | 1/2011 |
| CN | 101951427 A | 1/2011 |
| CN | 102014191 A | 4/2011 |
| CN | 101815120 A | 8/2011 |
| CN | 102592210 A | 7/2012 |

OTHER PUBLICATIONS

Extended European Search Report in European Application No. 12859770.5, mailed Jun. 11, 2015, 6 pages.

* cited by examiner

INFORMATION PROMPT METHOD, APPARATUS AND TERMINAL DEVICE

This application is a continuation of International Application No. PCT/CN2012/081567, filed on Sep. 19, 2012, which claims priority to Chinese Patent Application No. 201110432256.6, filed on Dec. 21, 2011, both of which are hereby incorporated by reference in their entireties.

TECHNICAL FIELD

Embodiments of the present invention relate to communications technologies, and in particular, to an information prompt method, apparatus and terminal device.

BACKGROUND

With the continuous development of communications technologies, people may exchange information by using various terminal devices, for example, a user may communicate by using applications such as email, short message service, and instant messaging tool on a terminal device.

For example, when a user sends an email, if the user needs to add personal information of a contact, for example, an Email address, a telephone number or other information, to the email when writing the email body, the user needs to open a contact list in the email application to find the personal information of the contact, and copy the personal information into the email body that is being written. For example, when a user sends a short message service (SMS) message, if the user needs to send contact information of another person to the recipient by using an SMS message, the user needs to check an address book of a mobile phone to find the required contact information, and copy the contact information into the body of the SMS message.

Therefore, in the prior art, the process of inserting contact information is relatively complex, resulting in low user operation efficiency

SUMMARY OF THE INVENTION

Embodiments of the present invention provide an information prompt method, apparatus and terminal device to solve the low operation efficiency problem when a user inserts contact information.

An embodiment of the present invention provides an information prompt method. In this example, the information prompt method includes identifying a contact keyword contained in body content edited in an editing interface, and extracting from a contact database at least one piece of contact information. The extracted contact information corresponds to the contact keyword. The information prompt method further includes generating at least one editing operation according to the contact information and an operation command for the contact information, displaying the at least one editing operation in the editing interface for a user to select, and executing the operation command for the contact information corresponding to the editing operation according to the selection of the user.

Another embodiment of the present invention provides an information prompt processing apparatus. In this example, the information prompt processing apparatus comprises an identification unit configured to identify a contact keyword contained in body content edited in an editing interface. The information prompt processing apparatus further comprises a prompt processing unit configured to extract from a contact database at least one piece of contact information corresponding to the contact keyword, to generate at least one editing operation according to the contact information and an operation command for the contact information, and to display the at least one editing operation in the editing interface for a user to select. The information prompt processing apparatus further comprises a command executing unit configured to execute the operation command for the contact information corresponding to the editing operation according to the selection of the user.

Yet another embodiment of the present invention further provides a terminal device, including the foregoing information prompt processing apparatus.

In the embodiments of the present invention, if content edited in an editing interface contains a contact keyword, at least one piece of contact information corresponding to the contact keyword is extracted from a contact database; then at least one editing operation is generated according to the contact information and an operation command for the contact information, and is displayed in the editing interface for a user to select. Therefore, the user may select one or more editing operations according to a displayed prompt message; and the operation command for the contact information corresponding to the editing operation may be executed according to the selection of the user, so as to add the required contact information to the editing interface. Therefore, in the embodiments of the present invention, when a user needs to add contact information to an editing interface, it is unnecessary for the user to open a contact list to find the contact information and paste the contact information in the editing interface. Instead, the user may select an editing operation displayed in the editing interface and add required contact information to a desired position; operations are simple in this process and may improve the user operation efficiency.

BRIEF DESCRIPTION OF THE DRAWINGS

To describe the technical solutions in the embodiments of the present invention art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
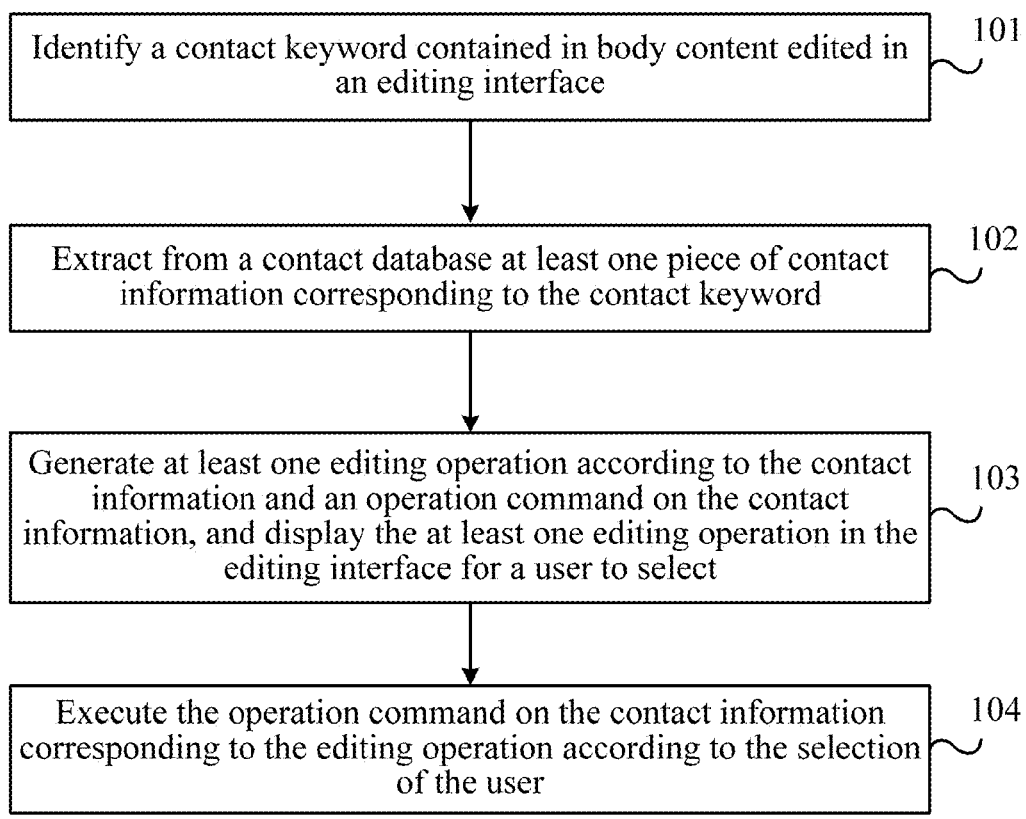
FIG. 1 is a flow chart of Embodiment 1 of an information prompt processing method according to the present invention.

FIG. 1 is a flow chart of Embodiment 1 of an information prompt processing method according to the present invention. As shown in FIG. 1, the method according to this embodiment may include:

Step 101: Identify a contact keyword contained in body content edited in an editing interface.

To be specific, in this embodiment, an information prompt processing apparatus may be added in a terminal device to implement the method of this embodiment, and the information prompt processing apparatus may be implemented in the form of hardware or software, which is not limited in this embodiment.

An existing communications tool may be installed on the terminal device in this embodiment, and the communications tool may be an email box, for example, Outlook; an instant messaging tool, such as MSN or QQ; a short message service or multimedia messaging service; a network information publishing tool such as microblog; and the like. It is understandable that communications tools in this embodiment may develop along with the development of various applications, and the communications tools are not limited to specific forms as long as the applications have a user editing interface.

A user as a sender may edit the body content that needs to be sent in an editing interface. For example, the user may edit the body of an email to be sent in an editing interface of a new email in Outlook; or the user may edit chat content to be sent in a QQ chat interface; or the user may edit an SMS message to be sent in a short message service editor of a mobile phone; or the user may edit microblog content to be posted in an editing interface of a microblog posting platform. It should be noted that this embodiment does not limit a manner in which the body content is edited in the editing interface. For example, the body content may be edited by using keyboard input or voice input. It should be noted that a person skilled in the art may adopt an existing voice input manner to enter on a terminal device the content that needs to be sent, so that the content is displayed in the editing interface; this process is not elaborated herein.

The information prompt processing apparatus may identify the body content edited by the user in the editing interface to determine whether the body content contains a contact keyword. In this embodiment, the contact keyword may be preset by the user or may be a default one.

For example, a computer, a mobile phone or other communications devices may all have a contact database, and the contact database may store related information of contacts. For each contact, the related information may include: a contact name, and at least one of an email address, a telephone number, a mailing address, and an instant messaging identifier corresponding to the contact name. It should be noted that the contact database in the embodiment of the present invention may specifically be implemented by creating a new database or using an original database that records contact information, and is not specifically limited herein.

The information prompt processing apparatus may use a contact name in the contact database as a contact keyword by default. Accordingly, the information prompt processing apparatus may determine whether the contact name in the contact database is contained by identifying the body content edited by the user in the editing interface. The user may also preset other contact keywords in the information prompt processing apparatus, for example, a telephone number in the contact database, and accordingly, the information prompt processing apparatus may determine whether the telephone number in the contact database is contained by identifying the body content edited by the user in the editing interface. It should be noted that the identification process of the information prompt processing apparatus may be performed after the body content is edited, or performed when the body content is edited, which is not limited in this embodiment.

Step 102: Extract from a contact database at least one piece of contact information corresponding to the contact keyword.

If the information prompt processing apparatus determines that the body content edited by the user contains the contact keyword, the information prompt processing apparatus may extract from the contact database at least one piece of contact information corresponding to the contact keyword. For example, if the information prompt processing apparatus determines that the contact keyword is "Zhang san", contact-related information corresponding to "Zhang san" and stored in the contact database may include an email address of Zhang san: zhangsan@gmail.com; a mobile phone number: 186******; a mailing address: No. X, X street, Haidian district, Beijing; a QQ account number: 1234567, and the like. The information prompt processing apparatus may extract one or more pieces of contact information from the contact-related information, for example, two pieces of contact information, namely, zhangsan@gmail.com and 186****** may be extracted.

Step 103: Generate at least one editing operation according to the contact information and an operation command for the contact information, and display the at least one editing operation in the editing interface for a user to select.

The information prompt processing apparatus may generate at least one editing operation according to the extracted contact information and an operation command for the contact information, and display the at least one editing operation in the editing interface for a user to select. An editing operation in this embodiment may be, for example, at least one of the following operations: an operation of adding the contact information to the body content, an operation of adding the contact information as a recipient, an operation of inviting a contact corresponding to the contact information to a session. Furthermore, it should be noted that each piece of extracted contact information may correspond to one or more of the foregoing operations. For example, if the extracted contact information is zhangsan@gmail.com, the editing operation may include at least one of the following operations: an operation of adding zhangsan@gmail.com to the body content, an operation of adding zhangsan@gmail.com as a recipient, and an operation of adding zhangsan@gmail.com as a carbon copy recipient; if the contact information is 186******, the editing operation may include at least one of the following operations: an operation of adding 186**** to the body content, and an operation of adding 186**** as a recipient; if the contact information includes both zhangsan@gmail.com and 186******, the editing operation may be a combination of the foregoing two operations. It should be noted that the editing operation is not limited to the foregoing operations; a person skilled in the art may set other operations that are more user-friendly and more in line with personal habits and preference of the user according to a user requirement.

The information prompt processing apparatus may display the at least one editing operation in an editing interface of a communications tool. In a specific implementation, manners of displaying an editing operation may vary according to editing interfaces of different communications tools. A person skilled in the art may design a specific display manner as necessary, for example, the editing operation may be displayed in the form of a menu item following a cursor.

Step 104: Execute the operation command for the contact information corresponding to the editing operation according to the selection of the user.

After the information prompt processing apparatus completes the foregoing display operation, the user may learn which editing operations are available. If the user needs to select one of the editing operations, the user may select the editing operation. Then, the information prompt processing apparatus may execute the operation command for the contact information corresponding to the editing operation according to the selection of the user, so as to add the contact information to the editing interface. It should be noted that the selection operation may be specifically implemented based on the prior art, for example, one or more displayed editing operations may be selected by clicking with a mouse or by directly tapping with a finger; or a sequence number may be added before each editing operation, and one or more displayed editing operations are selected by pressing number keys on a keyboard. For example, in an email editing interface of Outlook, the information prompt processing apparatus may display editing operations "add zhangsan@gmail.com to body content", "add zhangsan@gmail.com as a recipient", and "add zhangsan@gmail.com as a carbon copy recipient" in the form of menu items, and the user may select the operation "add zhangsan@gmail.com to body content" and the operation "add zhangsan@gmail.com as a recipient" by clicking with a mouse; hence, zhangsan@gmail.com is added to both the email body content and a recipient edit box. It should be noted that a person skilled in the art may design a position in the body content where "zhangsan@gmail.com" is added, for example, "zhangsan@gmail.com" may be added after the contact keyword "Zhang san", or added in any other position in the email body.

In this embodiment, if content edited in an editing interface contains a contact keyword, at least one piece of contact information corresponding to the contact keyword is extracted from a contact database; then, at least one editing operation is generated according to the contact information and an operation command for the contact information, and is displayed in the editing interface for a user to select. Therefore, the user may select one or more editing operations according to a displayed prompt message, and the operation command for the contact information corresponding to the editing operation may be executed according to the selection of the user, so as to add the required contact information to the editing interface. Therefore, in this embodiment, when a user needs to add contact information to an editing interface, it is unnecessary for the user to open a contact list to find the contact information and paste the contact in the editing interface. Instead, the user may select an editing operation displayed in the editing interface and add required contact information to a desired position; operations are simple in this process and may improve the user operation efficiency.

In another embodiment of the information prompt processing method of the present invention, the information prompt processing apparatus may further detect whether the user has executed one or more editing operations, and if the user has executed an editing operation, the editing operation is not displayed. For example, it is assumed that the information prompt processing apparatus detects that the user has entered "zhangsan@gmail.com" in a recipient edit box of Outlook; then, the operation "add zhangsan@gmail.com as a recipient" is not displayed in the editing interface. Therefore, displayed content is simplified, making it convenient for a user to select an actually needed editing operation.

In still another embodiment of the information prompt processing method of the present invention, the information prompt processing apparatus may further sort, according to the body content, display priorities of the editing operations that need to be displayed. To be specific, the information prompt processing apparatus may have a semantic analysis function. The information prompt processing apparatus may parse the meaning of the body content edited by the user in the editing interface to learn a possible intention of the user, and sort, according to the possible intention of the user, the display priorities of the editing operations that need to be displayed. It should be noted that the semantic analysis on the edited content may be specifically implemented based on the prior art, which is not described again herein. Using the scenario where a user edits an SMS message as an example, it is assumed that the body content of the SMS message edited by the user is "send an express delivery to Zhang san"; then, the information prompt processing apparatus may extract the contact keyword "Zhang san", and the editing operations that need to be displayed include: adding "zhangsan@gmail.com" to the body content of the SMS message, adding "186******" as a recipient of the SMS message, and adding "No. X, X street, Haidian district, Beijing" to the body content of the SMS message. The information prompt processing apparatus may further determine, according to "express delivery" in the body content "send an express delivery to Zhang san" of the SMS message, that the operation of adding "No. X, X street, Haidian district, Beijing" to the body content of the SMS message among the foregoing editing operations needs to be displayed first. Therefore, the information prompt processing apparatus may sort the operations according to a display order of adding "No. X, X street, Haidian district, Beijing" to the body content of the SMS message, adding "zhangsan@gmail.com" to the body content of the SMS message, and adding "186****" as a recipient of the SMS message, or according to a display order of adding "No. X, X street, Haidian district, Beijing" to the body content of the SMS message, adding "186******" as a recipient of the SMS message, and adding "zhangsan@gmail.com" to the body content of the short message service message. Therefore, by sorting the display priorities, the user may first see a needed operation and perform the operation conveniently. It should be noted that the information prompt processing apparatus may further perform multi-level sorting according to more meanings in the body content, so that the sorting approximates to as much as possible an operation sequence needed by the user.

In still another embodiment of the information prompt processing method, the information prompt processing apparatus may further detect whether the user performs a selection operation, and stop displaying the editing operation if the user abandons the selection operation. In a specific implementation, an editing operation that needs to be displayed may be presented in the form of a prompt box. The information prompt processing apparatus may adopt the following manners to determine whether a user abandons a selection operation: if the user does not click item information of any editing operation in the prompt box within a preset duration, it is determined that the user abandons the selection operation; or if the user clicks a close bar in the prompt box, it is determined that the user abandons the selection operation; or if the user performs a preset closing operation, it is determined that the user abandons the selection operation. For example, in a scenario where a computer keyboard is used for editing, the closing operation may be pressing Esc on the keyboard or pressing the space key, or clicking in a blank space in the editing interface with a mouse or pressing the right button of the mouse, and the like. In a scenario where a communications device such as a mobile phone is used for operation, the closing operation may be pressing a hang up button, key * or key #; as for a touchscreen computer or mobile phone, the user may, for example, tap a blank space in the editing interface with a finger.

The following describes in detail the technical solution in the foregoing embodiments by using several specific embodiments.

Figure 2:
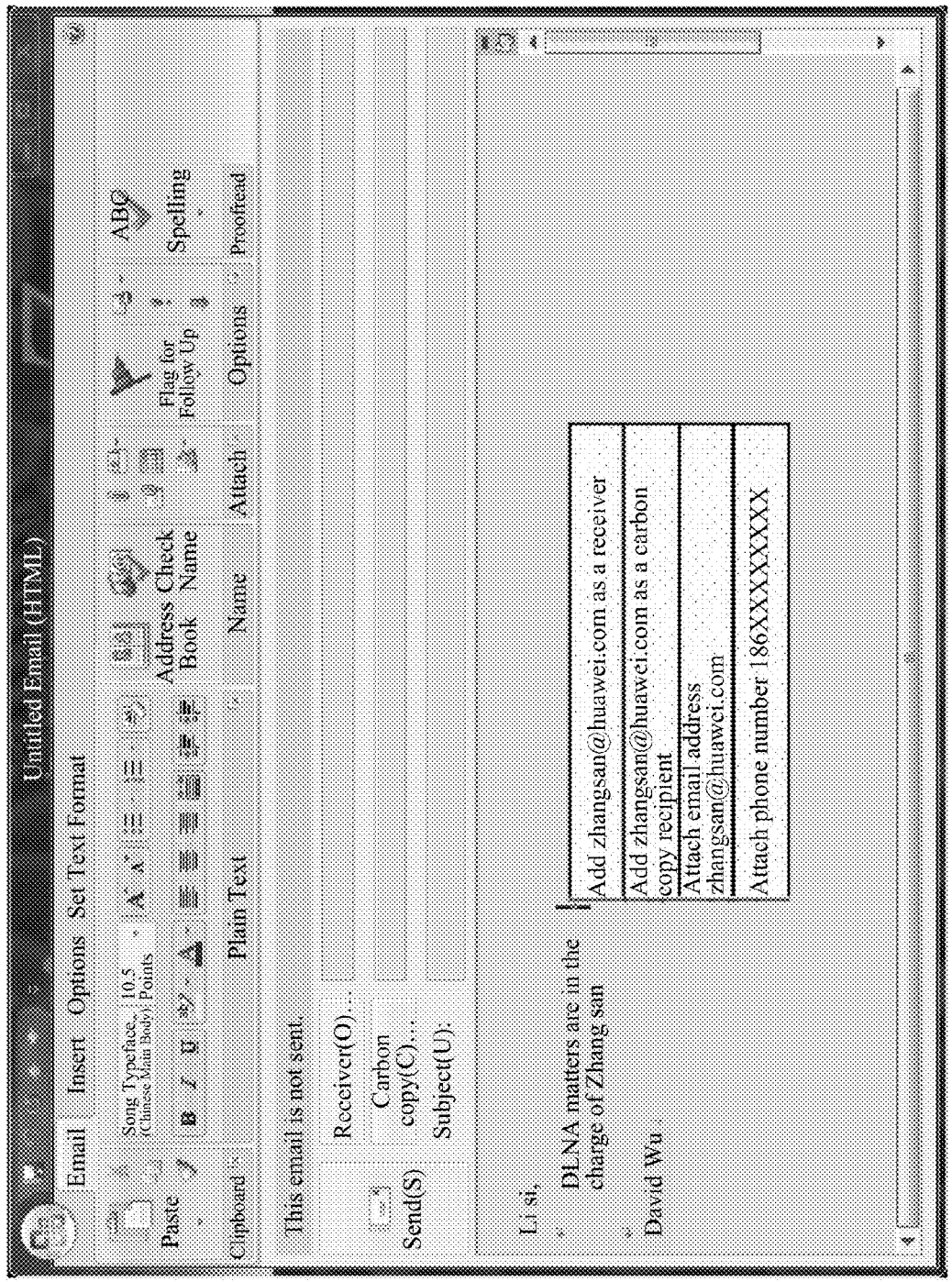
FIG. 2 is a schematic diagram of display of an editing interface in Embodiment 2 of an information prompt processing method according to the present invention.

FIG. 2 is a schematic diagram of display of an editing interface in Embodiment 2 of an information prompt processing method according to the present invention. As shown in FIG. 2, in this embodiment, using Outlook for communication on a terminal device is used as an example for description. This embodiment may be implemented when a user edits body content.

To be specific, when a user edits body content of an email, the information prompt processing apparatus may determine that the body content "DLNA matters are in the charge of Zhang san" edited by the user in an editing interface of the email contains a contact keyword "Zhang san". Then, the information prompt processing apparatus may extract contact information corresponding to "Zhang san" from a contact database, where the contact information includes: an email address "zhangsan@huawei.com" and a phone number "186*****". Therefore, editing operations corresponding to the email address "zhangsan@huawei.com" include the following operations shown in FIG. 2: "add zhangsan@huawei.com as a recipient", "add zhangsan@huawei.com as a carbon copy recipient", and "attach email address zhangsan@huawei.com"; and an editing operation corresponding to the phone number "186***" includes the following operation shown in FIG. 2: "attach phone number 186*****".

If not performing any other processing, the information prompt processing apparatus may directly display the four editing operations shown in FIG. 2 in the editing interface to prompt the user. Optionally, before displaying the editing operations shown in FIG. 2, the information prompt processing apparatus may further detect whether one or more editing operations shown in FIG. 2 have been executed. For example, the information prompt processing apparatus may detect whether the phone number 186***** has been attached after the cursor, and if yes, the editing operation "attach phone number 186*****" is not displayed. In another example, the information prompt processing apparatus may detect whether zhangsan@huawei.com has been added to a recipient edit box, and if yes, the editing operation "add zhangsan@huawei.com as a recipient" is not displayed either.

The user may select one or more editing operations according to a prompt message of the editing operations shown in FIG. 2. The selection operation may be, for example, directly clicking a required editing operation with a mouse. If the user selects "add zhangsan@huawei.com as a recipient", the information prompt processing apparatus may directly add zhangsan@huawei.com to the recipient edit box of the email; if the user selects "attach phone number 186*****", the information prompt processing apparatus may attach 186***** to the body content, for example, attach the phone number after "Zhang san".

If the user does not need to select any editing operation shown in FIG. 2, the information prompt processing apparatus may stop displaying. For example, if the user clicks in a blank space with a mouse, the information prompt processing apparatus may stop displaying.

Figure 3:
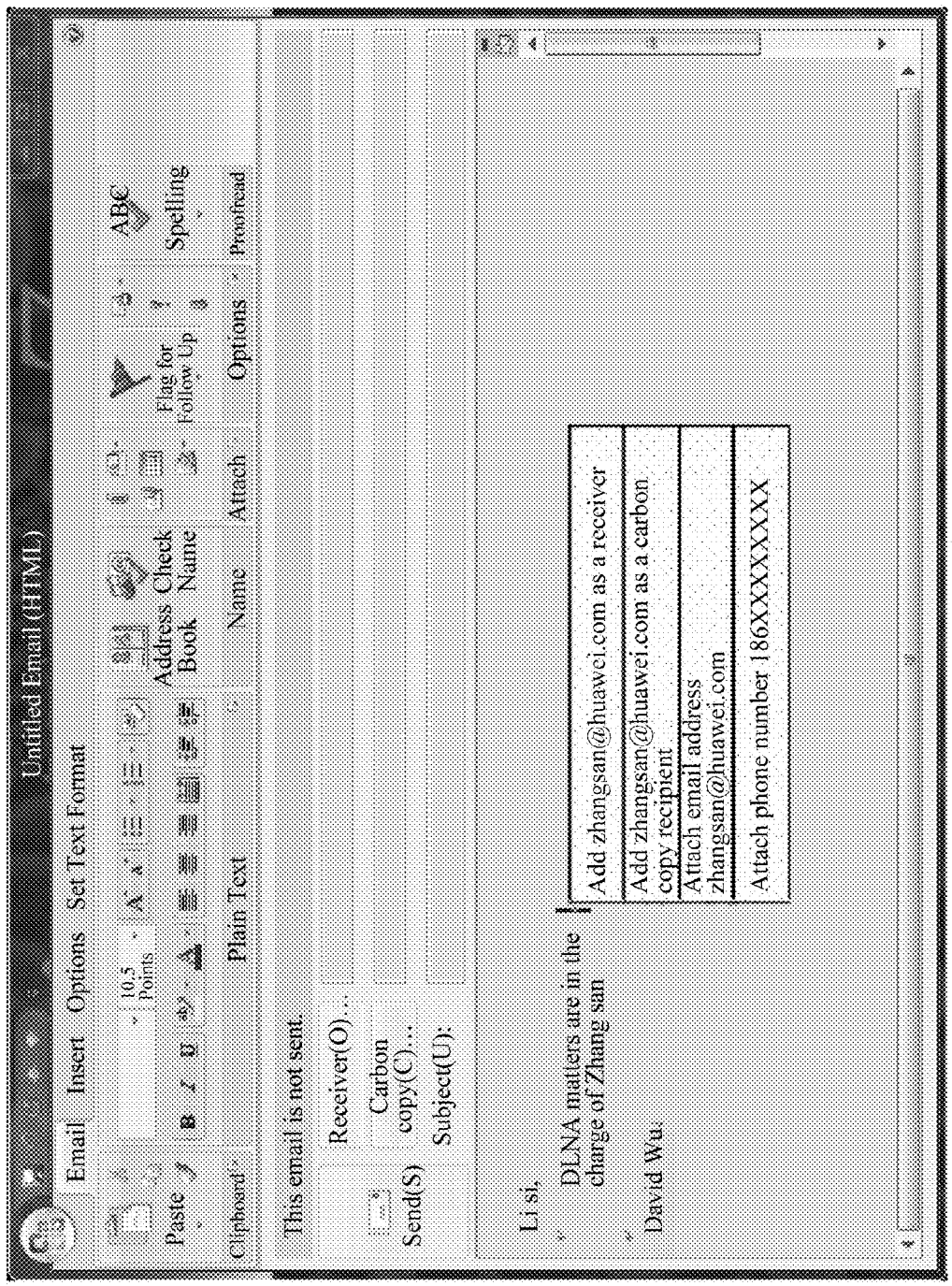
FIG. 3 is a schematic diagram of display of an editing interface in Embodiment 3 of an information prompt processing method according to the present invention.

FIG. 3 is a schematic diagram of display of an editing interface in Embodiment 3 of an information prompt processing method according to the present invention. As shown in FIG. 3, in this embodiment, communication by means of Outlook on a terminal device is still used as an example for description. This embodiment may be implemented when a user enters a recipient identifier after editing part or all of body content. The recipient identifier in this embodiment may be any information capable of indicating a recipient identity, such as an email address and an instant messaging number of the recipient.

To be specific, when a user enters a recipient identifier after editing body content of an email, the information prompt processing apparatus may determine that the body content "DLNA matters are in the charge of Zhang san" edited by the user in an editing interface of the email contain a contact keyword "Zhang san". Then, the information prompt processing apparatus may extract contact information corresponding to "Zhang san" from a contact database, where the contact information may be an email address "zhangsan@huawei.com". Therefore, editing operations corresponding to the email address "zhangsan@huawei.com" include the following operations shown in FIG. 3: "add zhangsan@huawei.com as a recipient" and "add zhangsan@huawei.com as a carbon copy recipient" shown in FIG. 3.

If not performing any other processing, the information prompt processing apparatus may directly display the two editing operations shown in FIG. 3 in the editing interface to prompt the user. Optionally, before displaying the editing operations shown in FIG. 3, the information prompt processing apparatus may further detect whether one or more editing operations shown in FIG. 3 have been executed. For example, the information prompt processing apparatus may detect whether zhangsan@huawei.com has been added to a recipient edit box, and if yes, the information prompt processing apparatus may not display the editing operation "add zhangsan@huawei.com as a recipient".

The user may select one or more editing operations according to a prompt message of the editing operations shown in FIG. 3. The selection operation may be, for example, directly clicking a required editing operation with a mouse. If the user selects "add zhangsan@huawei.com as a recipient", the information prompt processing apparatus may add zhangsan@huawei.com to the recipient edit box of the email.

If the user does not need to select any editing operation shown in FIG. 3, the information prompt processing apparatus may stop displaying. For example, if the user presses a space key, the information prompt processing apparatus may stop displaying.

It should be noted that the technical solutions provided in Embodiment 2 and Embodiment 3 of the present invention may be combined during implementation.

Figure 4:
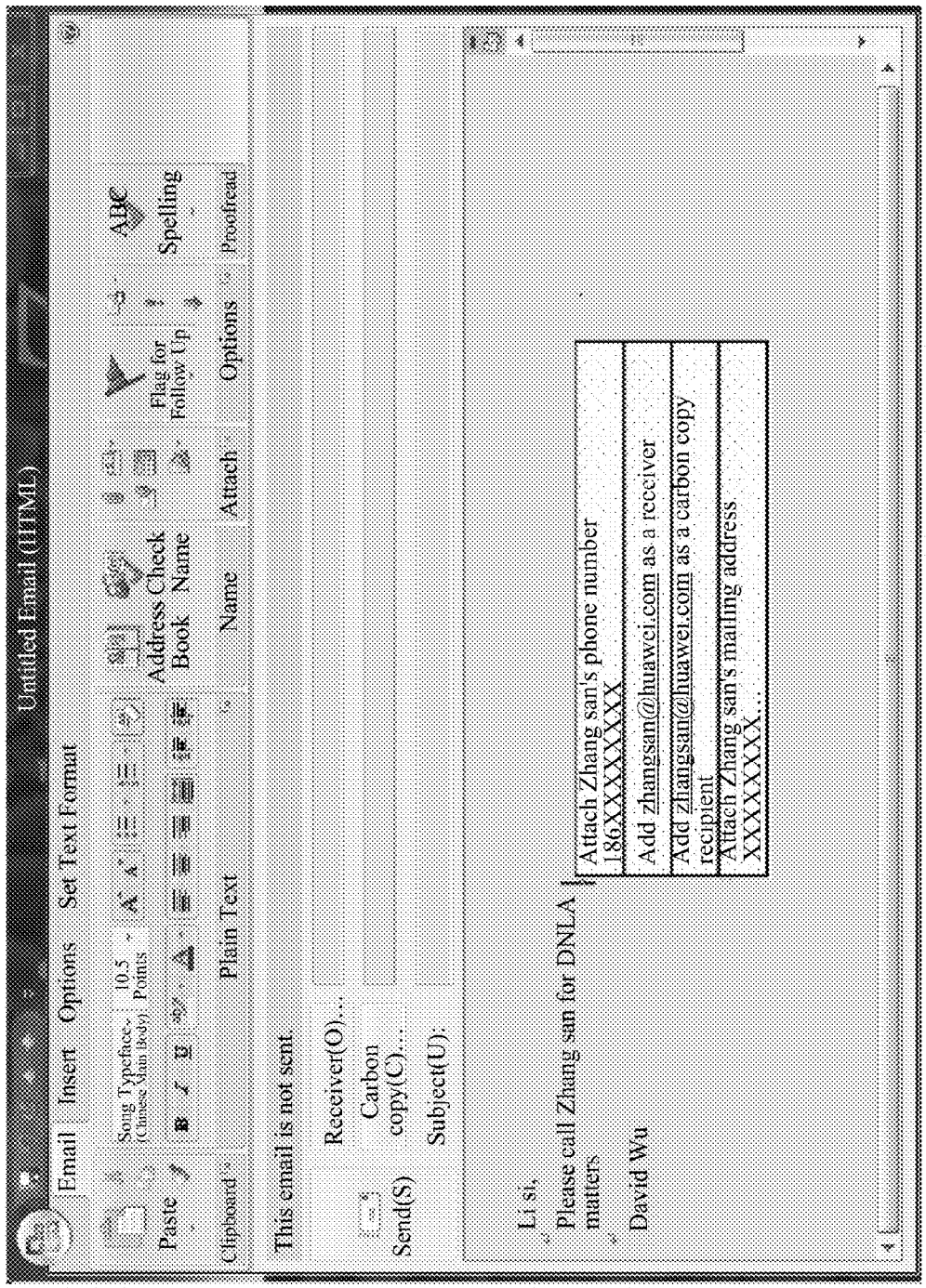
FIG. 4 is a schematic diagram of display of an editing interface in Embodiment 4 of an information prompt processing method according to the present invention.

FIG. 4 is a schematic diagram of display of an editing interface in Embodiment 4 of an information prompt processing method according to the present invention. As shown in FIG. 4, an implementation principle of this embodiment is similar to that of Embodiment 2 shown in FIG. 2, and the difference in this embodiment lies in that an information prompt processing apparatus may sort display priorities of editing operations according to body content when displaying the editing operations.

To be specific, the information prompt processing apparatus may further analyze the meaning of the body content to speculate an editing operation expected by a user, so that the attached editing operation is more targeted. For example, attaching a contact phone number is probably most needed when a call is made, and attaching a contact mailing address is probably most needed when an express delivery is sent. In this embodiment, the information prompt processing apparatus may perform semantic analysis on the body content and learn that a mobile phone number is probably more needed by the content "call Zhang san" in the email. Therefore, the information prompt processing apparatus may display "attach the phone number of Zhang san 186*******" in the first place; if the body content of the email is "send an express delivery to Zhang san", the information prompt processing apparatus may display "attach the mailing address of Zhang san XXXXXXXX" in the first place.

Figure 5:
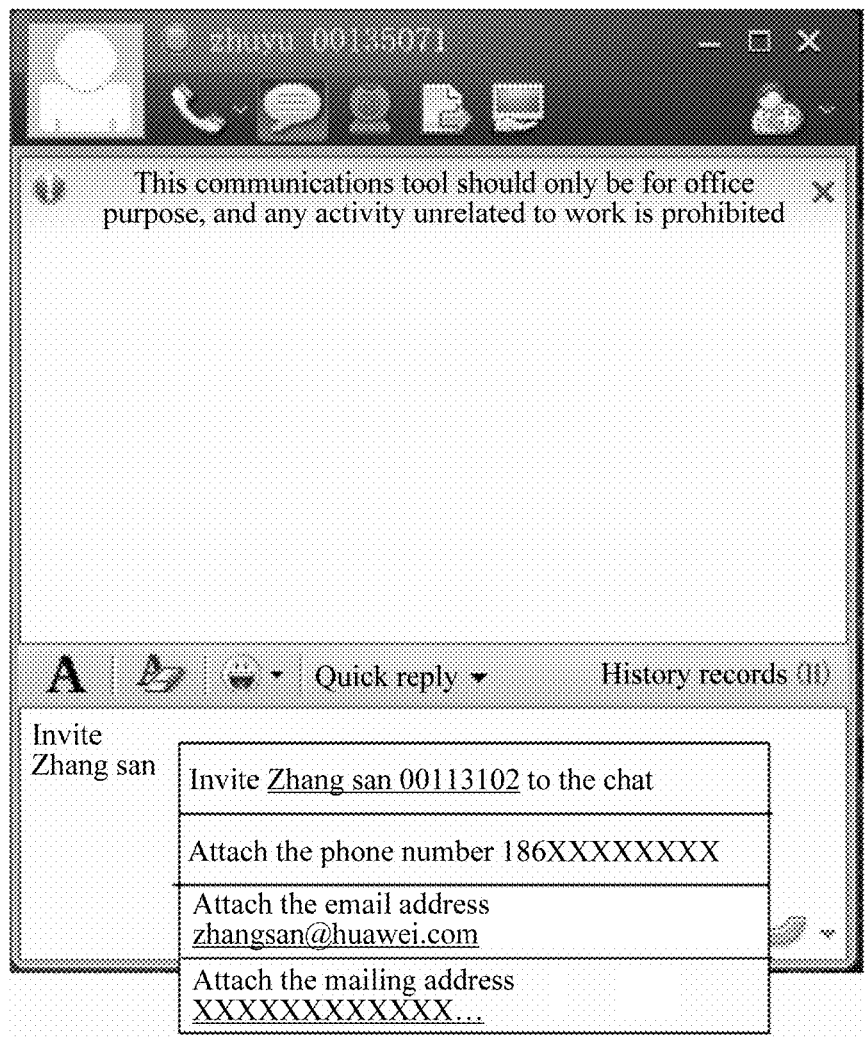
FIG. 5 is a schematic diagram of display of an editing interface in Embodiment 5 of an information prompt processing method according to the present invention.

FIG. 5 is a schematic diagram of display of an editing interface display in Embodiment 5 of an information prompt processing method according to the present invention. As shown in FIG. 5, in this embodiment, using an instant messaging tool as a communications tool is used as an example for description. This embodiment may be implemented when a user edits body content. The implementation process of this embodiment is similar to that of the method embodiment shown in FIG. 2, and the difference lies in content of displayed editing operations in the instant messaging scenario, for example, "invite Zhang san 00113102 to a chat" may be added.

It should be noted that the technical solution in the foregoing specific embodiment may be used in a scenario where a user edits an SMS message or a multimedia messaging service message, or a scenario where a user posts a microblog.

In the foregoing specific embodiment of the present invention, corresponding editing operations may be displayed in an editing interface for different application scenarios, so that a user may select one or more editing operations according to a displayed prompt message so as to add required contact information to the editing interface. Therefore, the embodiment of the present invention can help a user conveniently add contact information to an editing interface, and the operation is easy, hence improving the user operation efficiency.

Figure 6:
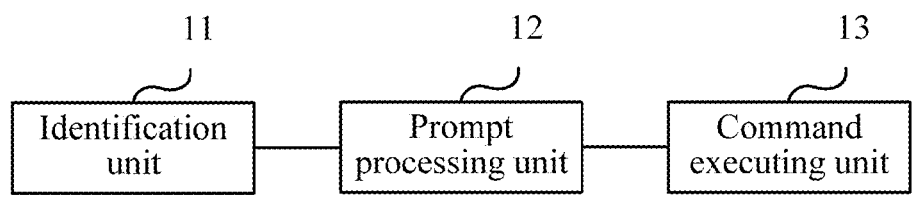
FIG. 6 is a schematic structural diagram of Embodiment 1 of an information prompt processing apparatus according to the present invention.

FIG. 6 is a schematic structural diagram of Embodiment 1 of an information prompt processing apparatus according to the present invention. As shown in FIG. 6, modules of this embodiment may include: an identification unit 11, a prompt processing unit 12, and a command executing unit 13, where the identification unit 11 is configured to identify a contact keyword contained in body content edited in an editing interface; the prompt processing unit 12 is configured to extract from a contact database at least one piece of contact information corresponding to the contact keyword contained in the content edited in the editing interface, generate at least one editing operation according to the contact information and an operation command for the contact information, and display the at least one editing operation in the editing interface for a user to select; and the command executing unit 13 is configured to execute the operation command for the contact information corresponding to the editing operation according to the selection of the user.

The information prompt processing apparatus in this embodiment is specifically configured to implement the technical solution in the method embodiment shown in FIG. 1; the implementation principle and technical effect of this embodiment are similar to those of the method embodiment shown in FIG. 1, which are not described again herein.

Figure 7:
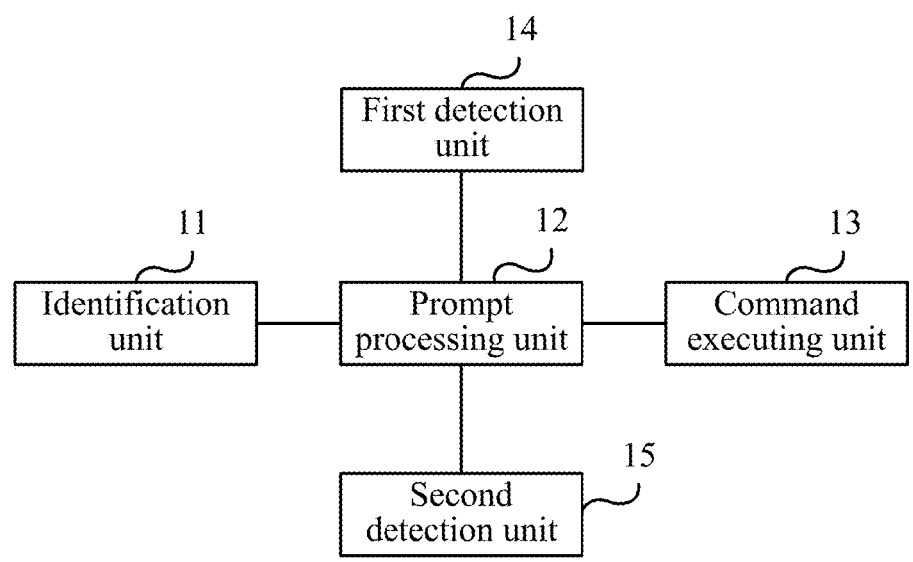
FIG. 7 is a schematic structural diagram of Embodiment 2 of an information prompt processing apparatus according to the present invention.

FIG. 7 is a schematic structural diagram of Embodiment 2 of an information prompt processing apparatus according to the present invention. As shown in FIG. 7, based on the structure shown in FIG. 6, this embodiment further includes: a first detection unit 14 and a second detection unit 15.

The identification unit 11 is specifically configured to: when a user edits body content, identify a contact keyword contained in the body content edited by the user in an editing interface; accordingly, the command executing unit 13 is specifically configured to add the contact information to the body content or add the contact information as a recipient according to the selection of the user. Or, the recognition unit 11 is specifically configured to: after receiving part or all of body content entered by a user, identify a contact keyword contained in the body content edited by the user in an editing interface when receiving a recipient identifier entered by the user.

The first detection unit 14 is configured to detect whether the user has executed one or more editing operations; and if the first detection unit 14 detects that an editing operation has been executed, the prompt processing unit 12 is specifically configured not to display the editing operation.

The second detection unit 15 is configured to detect whether the user performs a selection operation; and the prompt processing unit 12 is specifically configured to stop displaying the editing operation if the second detection unit 15 detects that the user abandons the selection operation. To be specific, the second detection unit 15 is specifically configured to: determine that the user abandons the selection operation if the user does not click item information of any editing operation in a prompt box within a preset duration; or determine that the user abandons the selection operation if the user clicks a close bar in the prompt box; or determine that the user abandons the selection operation if the user performs a preset closing operation.

In addition, the prompt processing unit 12 is further configured to sort, according to the body content, display priorities of the editing operations that need to be displayed.

The information prompt processing apparatus in this embodiment is specifically configured to implement the technical solutions in the method embodiments shown in FIG. 2 to FIG. 5, and the implementation principle and technical effect of this embodiment are similar to those of the method embodiments shown in FIG. 2 to FIG. 5, which are not described again herein.

The present invention further provides a terminal device, and the terminal device may include the information prompt processing apparatus shown in FIG. 6 or FIG. 7. For the technical solution of a specific implementation of the terminal device in this embodiment, reference may be made to the methods in the method embodiments shown in FIG. 2 to FIG. 5. The implementation principle and technical effect of the terminal device are similar to those of the method embodiments shown in FIG. 2 to FIG. 5, and are not described again herein.

A person of ordinary skill in the art may understand that, all or a part of the processes of the foregoing method embodiments may be implemented by a computer program instructing relevant hardware. The foregoing program may be stored in a computer readable storage medium. When the program runs, the steps of the foregoing method embodiments are performed. The foregoing storage medium may include any mediums capable of storing program code, such as a ROM, a RAM, a magnetic disk, or an optical disc.

Finally, it should be noted that the foregoing embodiments are merely intended for describing the technical solutions of the present invention, other than limiting the present invention. Although the present invention is described in detail with reference to the foregoing embodiments, a person of ordinary skill in the art should understand that he may still make modifications to the technical solutions described in the foregoing embodiments, or make equivalent replacements to some technical features thereof, without departing from the scope of the technical solutions of the embodiments of the present invention.

What is claimed is:

1. An information prompt method, comprising:
identifying a contact keyword contained in body content edited in an editing interface;
extracting, from a contact database, contact information corresponding to the contact keyword;
generating at least one editing operation according to the contact information and an operation command for the contact information;
detecting that a user has executed one or more of the generated editing operations;
sorting, according to a semantic analysis of the body content, display priorities of at least one unexecuted editing operation that needs to be displayed;
displaying the at least one unexecuted editing operation in the editing interface according to the sorted display priorities for the user to select without displaying the one or more executed editing operations, wherein displaying the at least one unexecuted editing operation in the editing interface comprises displaying a postal address of a party in the editing interface first among the at least one unexecuted editing operation when the body content indicates an express delivery to the party; and
executing the operation command for the contact information corresponding to the editing operation according to the selection of the user.

2. The method according to claim 1, wherein the identifying a contact keyword contained in body content edited in an editing interface comprises:
identifying the contact keyword contained in the body content edited by the user in the editing interface when the user edits the body content,
wherein the editing operation comprises an operation of adding the contact information to the body content or an operation of adding the contact information as a recipient.

3. The method according to claim 1, wherein the identifying a contact keyword contained in body content edited in an editing interface specifically comprises:
after receiving part or all of the body content entered by the user, identifying the contact keyword contained in the body content edited by the user in the editing interface,
wherein the editing operation comprises an operation of adding the contact information as a recipient or a carbon copy recipient.

4. The method according to claim 1, further comprising:
after the displaying the at least one editing operation in the editing interface, detecting whether the user performs a selection operation, and stop displaying the editing operation if the user abandons the selection operation.

5. An information prompt processing apparatus, comprising:
a processor; and
a non-transitory computer readable storage device storing programming for execution by the processor, the programming including instructions to:
identify a contact keyword contained in body content edited in an editing interface;
extract from a contact database contact information corresponding to the contact keyword;
generate at least one editing operation according to the contact information and an operation command for the contact information;
detect that a user has executed one or more of the generated editing operations;
sort, according to a semantic analysis of the body content, display priorities of at least one unexecuted editing operation that needs to be displayed;
display the at least one unexecuted editing operation in the editing interface according to the sorted display priorities for the user to select without displaying the one or more executed editing operations, wherein displaying the at least one unexecuted editing operation in the editing interface comprises displaying a postal address of a party in the editing interface first among the at least one unexecuted editing operation when the body content indicates an express delivery to the party; and
execute the operation command for the contact information corresponding to the editing operation according to the selection of the user.

6. The apparatus according to claim 5, wherein the instructions to identify the contact keyword contained in the body content edited by the user in the editing interface include instructions to identify the contact keyword when the user edits the body content, and
wherein the programming further includes instructions to add the contact information to the body content or to add the contact information as a recipient according to the selection of the user.

7. The apparatus according to claim 5, wherein the instructions to identify the contact keyword contained in the body content edited by the user in the editing interface further include instructions to: after receiving part or all of the body content entered by the user, identify the contact keyword contained in the body content edited by the user in the editing interface when receiving a recipient identifier entered by the user, and
wherein the programming further includes instructions to add the contact information as a recipient or a carbon copy recipient.

8. The apparatus according to claim 5, wherein the programming further includes instructions to:
detect whether the user performs a selection operation; and stop displaying the editing operation if the instructions detect that the user abandons the selection operation.

9. A terminal device, comprising:

a processor; and a non-transitory computer readable storage device storing programming for execution by the processor, the programming including instructions to:

identify a contact keyword contained in body content edited in an editing interface;

extract from a contact database contact information corresponding to the contact keyword;

generate at least one editing operation according to the contact information and an operation command for the contact information;

detect that a user has executed one or more of the generated editing operations;

sort, according to a semantic analysis of the body content, display priorities of at least one unexecuted editing operation that needs to be displayed;

display the at least one unexecuted editing operation in the editing interface according to the sorted display priorities for the user to select without displaying the one or more executed editing operations, wherein displaying the at least one unexecuted editing operation in the editing interface comprises displaying a postal address of a party in the editing interface first among the at least one unexecuted editing operation when the body content indicates an express delivery to the party; and execute the operation command for the contact information corresponding to the editing operation according to the selection of the user.

10. The terminal device according to claim 9, wherein the instructions to identify the contact keyword contained in the body content edited by the user in the editing interface include instructions to identify the contact keyword when the user edits the body content, and wherein the programming further includes instructions to add the contact information to the body content or to add the contact information as a recipient according to the selection of the user.

11. The terminal device according to claim 9, wherein the instructions to identify the contact keyword contained in the body content edited by the user in the editing interface further include instructions to: after receiving part or all of the body content entered by the user, identify the contact keyword contained in the body content edited by the user in the editing interface when receiving a recipient identifier entered by the user, and wherein the programming further includes instructions to add the contact information as a recipient or a carbon copy recipient.

12. The terminal device according to claim 9, wherein the programming further includes instructions to:

detect whether the user performs a selection operation; and stop displaying the editing operation if the instructions detect that the user abandons the selection operation.

* * * * *